April 10, 1928.
L. A. JONES ET AL
1,666,047
PROJECTION SYSTEM
Filed Aug. 28, 1924
FIG.1.
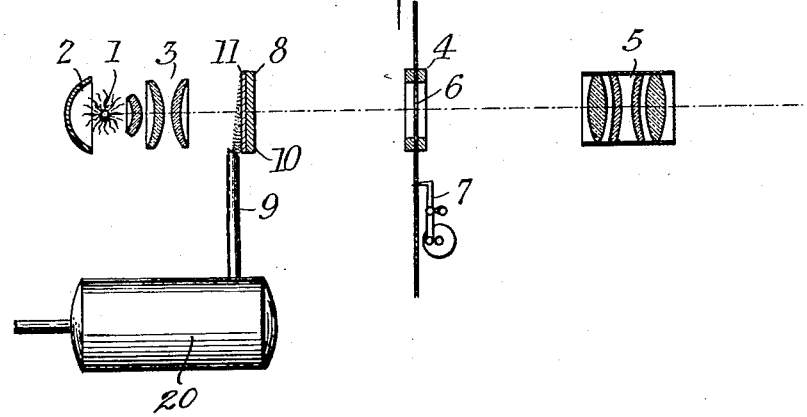
FIG.2.
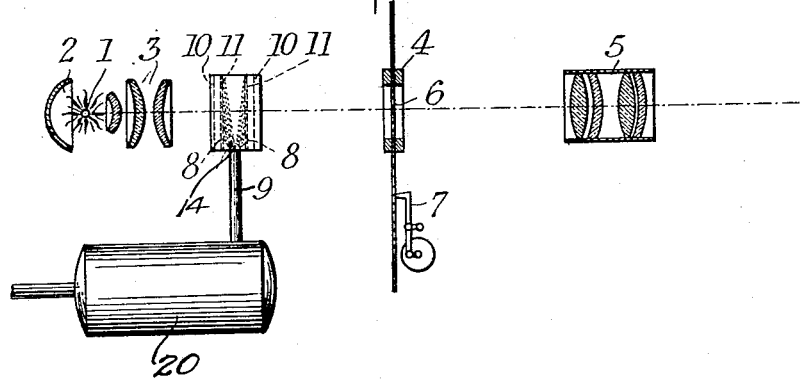
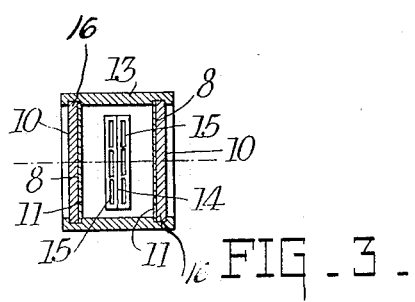
FIG.3.
INVENTORS,
Loyd A. Jones &
Earle E. Richardson,
ATTORNEYS.

Patented Apr. 10, 1928.

1,666,047

UNITED STATES PATENT OFFICE.

LOYD A. JONES AND EARLE E. RICHARDSON, OF ROCHESTER, NEW YORK, ASSIGNORS TO EASTMAN KODAK COMPANY, OF ROCHESTER, NEW YORK, A CORPORATION OF NEW YORK.

PROJECTION SYSTEM.

Application filed August 28, 1924. Serial No. 734,799.

Our invention relates to projection systems and particularly to such systems designed for use with films having a base or support of cellulosic material, such as ordinarily used for the projection of motion pictures.

Even where such films are not held stationary for the projection of "stills" or titles, but are moved rapidly through the projector, the heat at the gate may be such as to affect them injuriously. Numerous experiments have been proposed to overcome this without unduly reducing illumination. Among these may be mentioned screens for reflecting heat rays, screens for absorbing heat rays and means for air-cooling the film gate. If screens for reflecting heat rays are made of sufficient density to be useful for that purpose, their transmission of light rays is so reduced that their utility for motion picture purposes is questionable. Heat absorbing screens have the disadvantage that they heat up rapidly and they then become radiators of heat. Liquid containing tanks have the disadvantages that the convection currents are objectionable and that such tanks are very undesirable in practice, particularly for portable projectors suitable for home use. Air directed across the surface of the film has a powerful cooling action, but it also has the effect of drying out the film with great rapidity, with the result that the film is injured about as much as if the means were not used.

Our invention has among its objects to provide a system that will screen the film from rays that will effect it injuriously, that will permit a high percentage of visible rays to pass, in which the film will not be subjected to harmful air currents and which is not impractically cumbersome or complicated.

We attain this and other objects by the use of a screen that will absorb most of the heat rays and that will transmit most of the light rays, and by releasing air under pressure so that it will impinge directly on the screen but not on the film. The screen is thus cooled by the expansion of the air as well as by the passage of air over it, while the film is not subjected to the drying effect of the air. The screen is thus kept from becoming hot enough to radiate an injurious amount of heat within the projection system.

Reference will now be made to the accompanying drawing wherein like reference characters indicate like parts throughout,—

Fig. 1 represents diagrammatically a projection system embodying our invention;

Fig. 2 represents diagrammatically a projection system embodying a different form of our invention, and Fig. 3 is a horizontal section of the cell shown in Fig. 2.

The projection system comprises a source of light 1, with the usual reflector 2, condenser 3, film gate 4, and objective 5. The film 6 is advanced past the film gate by any suitable mechanism indicated conventionally at 7. Positioned at any convenient point between the light and the film gate is a heat-absorbing screen 8. Near one edge of the screen is an outlet pipe 9 connected with a suitable source of compressed air 20. The pipe 9 has a vent at its end so formed and situated as to release the air under pressure and direct it against the surface of the screen that faces the light source 1, as indicated in dotted lines.

We have found particularly advantageous a screen comprising a glass support 10 on which is a gelatin layer 11 carrying heat absorbing material. Such salts as copper sulfate, copper chloride, copper acetate, copper nitrate and zinc chloride have been found satisfactory. These are soluble in water and a solution of them of any desired concentration is added to melted gelatin and coated in the usual way. No particular proportions have been found to be critical, but we have found that, if the amount of salts present weigh from two to six per cent of the weight of the finished and dried gelatin film, satisfactory results are obtained.

Instead of metallic salts, dyes known to have absorbent properties for red and infra red rays may be used. For instance, from one to three per cent of naphthalene green in the finished gelatin layer has been found satisfactory.

It is to be understood, however, that all proportions given are by way of example, and we do not limit ourselves to any particular formula. The screen is preferably mounted with the heat absorbing layer toward the light source.

Certain sources of light, such as arc lights, are particularly rich in ultra-violet rays and as these have a tendency to accelerate the deterioration or decomposition of certain cellulosic compositions, the support is preferably made of the known forms of glass that absorb ultra-violet light most strongly. There may, however, be incorporated in the gelatin layer a material that absorbs ultra-violet rays, in which case ordinary glass would be used as a support. Such materials are known and among them may be mentioned aesculin, beta-naphthol di-sulfonic acid, beta-naphthol quinoline sulfonate, beta-naphthol quinoline hydrochlorid. The first two dyes have been found satisfactory when present in proportions of about one to three per cent; and the last two about two to six per cent of the dried gelatin layer.

We find most efficient and practical the cell shown in Fig. 3 and in the system of Fig. 2. The other elements of this system are the same as in Fig. 1, but for absorbing heat we use a cell having metal sides 13 with grooves 16 in which fit two plates 8 in spaced position with the heat absorbing layer 11 of each facing inwardly. The cell is open at the top, and at the bottom is a pipe 9 having a head 14 with outlet vents 15 directing air, released from pressure, against the inner surfaces 11 of the screens.

It is to be understood that numerous embodiments of our invention are possible, and we contemplate as within the scope of our invention all such modifications and equivalents as fall within the scope of the appended claims.

Having thus described our invention, what we claim as new and desire to secure by Letters Patent is:

1. A projection system comprising a source of light, a film-positioning gate, a screen between said light and said gate and comprising a light transmitting support having upon one surface a thin layer having high absorptive properties for heat rays and low absorptive properties for visible rays, a source of air under pressure sufficient to have a refrigerative effect when released, and means to release air under pressure and to direct such air, as it is released, into contact with the layer.

2. A projection system comprising a source of light, a film-positioning gate, a screen between said light and said gate and comprising a light transmitting support having upon one surface of gelatine layer which is incorporated a material having high absorptive properties for heat rays and low absorptive properties for visible rays, and means to release air under pressure and to direct such air, as it is released, into contact with the layer.

3. A projection system comprising a source of light, a film-positioning gate, a screen between said light and said gate and comprising a light transmitting support having on one surface a thin gelatine layer in which is incorporated a material having high absorbing properties for heat and ultra-violet rays and low absorbing properties for visible rays, and means to force air across and in contact with the surface of said thin, gelatine layer.

4. A projection system comprising a source of light, a film positioning gate, a screen between said light and said gate and comprising a transparent support having upon one surface a thin layer having high absorptive properties for heat rays and low absorptive properties for visible rays, the screen having also high absorptive powers for ultra violet light, and means to force air across and in contact with the surface of said thin heat absorptive layer.

5. A projection system comprising a source of light, a film-positioning gate, a cell positioned between said light and said gate and having two spaced heat absorbing screens arranged transversely of the beam between the source of light and the gate, said screens comprising light transmitting supports having on their facing surfaces layers having high absorptive properties for heat rays and low absorptive properties for visible rays, means to admit and release air under pressure between said screens and at one edge of said cell.

6. A projection system comprising a source of light, a film-positioning gate, two spaced screens located transversely of the beam between the source of light and the gate, said screens comprising transparent supports having on their facing surfaces gelatine layers in which is incorporated a material having high heat absorbing properties and high transmitting properties for visible rays, and means for releasing air under pressure between said screens.

Signed at Rochester, New York this 22nd day of August, 1924.

LOYD A. JONES.
EARLE E. RICHARDSON.

CERTIFICATE OF CORRECTION.

Patent No. 1,666,047.                  Granted April 10, 1928, to

LOYD A. JONES ET AL.

It is hereby certified that error appears in the printed specification of the above numbered patent requiring correction as follows: Page 2, line 53, claim 2, for the word "of" read "a" and after the word "layer" insert the word "in"; and that the said Letters Patent should be read with these corrections therein that the same may conform to the record of the case in the Patent Office.

Signed and sealed this 29th day of May, A. D. 1928.

M. J. Moore,
(Seal)                        Acting Commissioner of Patents.